(12) United States Patent
Halsband

(10) Patent No.: US 9,758,260 B2
(45) Date of Patent: Sep. 12, 2017

(54) LOW VOLUME MICRO SATELLITE WITH FLEXIBLE WINDED PANELS EXPANDABLE AFTER LAUNCH

(71) Applicant: EFFECTIVE SPACE SOLUTIONS R&D LTD, Tel Aviv (IL)

(72) Inventor: Arie Halsband, Tel-Aviv Yafo (IL)

(73) Assignee: EFFECTIVE SPACE SOLUTIONS R&D LTD, Tel-Aviv (IL)

( * ) Notice: Subject to any disclaimer, the term of this patent is extended or adjusted under 35 U.S.C. 154(b) by 30 days.

(21) Appl. No.: 14/420,378

(22) PCT Filed: Aug. 8, 2013

(86) PCT No.: PCT/IL2013/050681
§ 371 (c)(1),
(2) Date: Feb. 9, 2015

(87) PCT Pub. No.: WO2014/024199
PCT Pub. Date: Feb. 13, 2014

(65) Prior Publication Data
US 2015/0217876 A1    Aug. 6, 2015

Related U.S. Application Data

(60) Provisional application No. 61/680,737, filed on Aug. 8, 2012.

(51) Int. Cl.
*B64G 1/22* (2006.01)
*B64G 1/10* (2006.01)
(Continued)

(52) U.S. Cl.
CPC .............. *B64G 1/222* (2013.01); *B64G 1/10* (2013.01); *B64G 1/242* (2013.01); *B64G 1/44* (2013.01);
(Continued)

(58) Field of Classification Search
CPC .......... B64G 1/44; B64G 1/443; B64G 1/646; B64G 1/222
See application file for complete search history.

(56) References Cited

U.S. PATENT DOCUMENTS 3,510,086 A * 5/1970 Lanz ........................ B64G 1/22
136/245
4,043,834 A   8/1977 Rusch
(Continued)

FOREIGN PATENT DOCUMENTS

| GB | 1268841 | 3/1972 |
|---|---|---|
| WO | WO 2005/110847 | 11/2005 |
| WO | WO 2011006506 | 1/2011 |

OTHER PUBLICATIONS

European Search Report of Application No. EP 13 82 7451, mailed on Mar. 18, 2016.
(Continued)

*Primary Examiner* — Philip J Bonzell
(74) *Attorney, Agent, or Firm* — Pearl Cohen Zedek Latzer Baratz LLP

(57) ABSTRACT

Micro satellite is disclosed with foldable solar panels that may be winded around the body of the micro satellite so that the growth in outer dimensions of the satellite is no more than 10-20 mm along each one of the length, width and height of the microsatellite so that the micro satellite may be launched in an auxiliary payload volume of a launcher. The foldable solar panels may be deployed to employ area that exceeds 9 times the product of the length by the width of the satellite and 6 times the product of the height by the length. The solar power produced by the solar panel and their light weight enable carrying of cargo that is at least 0.6 of the of the total mass of the satellites.

7 Claims, 21 Drawing Sheets

(51) Int. Cl.
  *B64G 1/44* (2006.01)
  *B64G 1/64* (2006.01)
  *H02S 30/20* (2014.01)
  *B64G 1/24* (2006.01)

(52) U.S. Cl.
  CPC ............ *B64G 1/443* (2013.01); *B64G 1/646* (2013.01); *H02S 30/20* (2014.12)

(56) References Cited

U.S. PATENT DOCUMENTS

| | | | |
|---|---|---|---|
| 4,787,580 A * | 11/1988 | Ganssle | B64G 1/222 244/172.6 |
| 8,387,921 B2 * | 3/2013 | Taylor | B64G 1/222 136/245 |
| 2005/0040282 A1 | 2/2005 | Wingo | |
| 2007/0125910 A1 | 6/2007 | Cepollina | |
| 2008/0173349 A1 | 7/2008 | Liu et al. | |
| 2011/0210209 A1 * | 9/2011 | Taylor | B64G 1/222 244/172.6 |
| 2012/0012154 A1 * | 1/2012 | Keller | B64G 1/222 136/245 |
| 2012/0297717 A1 * | 11/2012 | Keller | B64G 1/222 52/645 |

OTHER PUBLICATIONS

Romeo, A. et al., "Development of high efficiency flexible CdTe solar cells" PV in Europe—From PV Technology to Energy Solutions, Oct. 7-11, 2002.

H.S. Ullal, NREL, The National Renewal Energy Laboratory: "Overview and challenges of thin film solar electronic technologies", Dec. 2008.

NREL, The National Renewal Energy Laboratory, "Best Research Cell Efficiencies", Rev. 4, 2011.

International Search Report of Application No. PCT/IL2013/050681, mailed on Dec. 2, 2013.

* cited by examiner

Section A-A

| Luncher | Payload capacity @ 700 Km SSO | Number of auxiliary payloads available | Size(m) & Weight (Kg) Limitations | Estimated auxilliary paylaods price(M$) | Estimated whole launcher price (M$) | Total No of 150 Kg Micro-Sats |
|---|---|---|---|---|---|---|
| Soyuz | 4500 | 4xmicro 1x mini | 150Kg 300 Kg, h max= 2m | 6.5 11.0 | 90 (70 ME) | 30 |
| Vega | 1500 | 1-2 Mini (future capacity) | 200 | TBD | 54 (40ME) | 10 |
| PSLV | 1500 | 2 micro | .70x.60x.85 @ 150Kg | 3 | 25 ( 20 ME) | 10 |
| SpaceX Phalcon 9 | 7500 | 2-4 | TBD | 5-10 | 60 | 40 |
| ULA Atlas 5 | NA | 1 micro | .51x.51x.76 @ 76 Kg | 3-5 | NA | NA |
| ULA EELV | NA | 6 micro | .61x.71x.96 @ 180 Kg | 3-5 | NA | NA |
| Spaceflight Internet site | NA | 6 slots per launch | .61x.71x.96 @ 180 Kg | 4.95 | NA | NA |

Fig. 19

LOW VOLUME MICRO SATELLITE WITH FLEXIBLE WINDED PANELS EXPANDABLE AFTER LAUNCH

CROSS-REFERENCE TO RELATED APPLICATIONS

This application is a National Phase Application of PCT International Application No. PCT/IL2013/050681, International Filing Date Aug. 8, 2013, entitled "Low Volume Micro Satellite with Flexible Winded Panels Expandable after Launch" published on Feb. 13, 2014 as International Publication No. WO 2014/024199, claiming priority of U.S. Provisional Patent Application No. 61/680,737, filed Aug. 8, 2012, which is incorporated herein by reference in its entirety.

BACKGROUND OF THE INVENTION

The present invention relates to microsatellites which can fit, in stowed state, into the volume of what is known as "Auxiliary Payload", as defined by most of the currently available launchers. Today the main obstacle to the microsatellites market is the cost of launch and its availability. A dedicated launch may cost much more than the microsatellite itself and will cause the mission to be non-cost effective. In fact it is well known in the microsatellites industry that the access to space, i.e. the launch availability and cost are the main obstacles to the industry. On the other hand, satellites that are designed today as auxiliary payloads are very small in order to fit into the envelope requirements of "Auxiliary payload" housing space (also referred to as permitted volume), and eventually have poor performances (low power source capacity, small area antennas) directly as a result of the auxiliary payload housing space dimensions that limit the available area of solar cell panels and transmit/receive antennas. This causes the mission of micro satellites to be ineffective.

These satellites are usually using rigid solar cells which need a stiff and rigid substrate or sub-structure. The substrate might be the satellite structure itself and the cells are mounted directly to the body of the satellite. This method limits the area which may be used for accommodating the solar cells and eventually the amount of electrical power that can be obtained. It also yields to a poor thermal control of the satellite by limiting the heat radiating surfaces available. The limited power will limit the satellite performance, and especially the output power for missions which need high energy output like communication. The thermal control regime, when using body mounted solar panels on its side will reduce the amount of heat dissipated from the satellite, and inherently will reduce the applicability for high energy missions like communication. The use of rigid deployed solar wings is a "weight consumer". The weight is another limited resource for such small satellites. In addition deployed solar wings require additional volume, and are reducing the limited available volume for the satellite itself.

Another limiting factor for such "auxiliary Payload" microsatellites is the size and amount of antennas used. In case of non-deployment antennas only limited number of them can be used, and usually on the Nadir facing panel. The size of the antennas in a non-deployment case is also severely limited and thus limiting the throughput of the satellite measured in EIRP which is the combination of the transmitting power and the antenna gain, dependent on its diameter.

SUMMARY OF THE INVENTION

The present invention—provides a micro satellite having two main states—stowed and deployed. It is designed to fit in stowed position to the restrictive envelope (w/h/l and weight) of an auxiliary payload as defined by the various launchers and to deploy significantly when in space to allow improved performance.

The present invention aims to solve the current need in the market for a satellite which will allow frequent and low cost access to orbit, using the auxiliary payload category, but will provide considerable performance while in space.

According to one embodiment of the present invention there is provided a small/micro satellite comprising:

A satellite body with maximum size measures adapted to fit into an auxiliary payload (e.g. of 60 cm width×70 cm length×96 cm height), and the weight of the satellite will not exceed the weight limitation of auxiliary payload (e.g. 180 kg) in launch configuration, and at least one deployable flexible solar array.

According to some embodiments the satellite dimensions and weight limitations are directly linked to the "Auxiliary payload" concept. FIG. 19 shows a summary of some launchers proposing this concept (also the term "rideshare" is used instead for auxiliary payload). It can be seen that the dimensions chosen of 60 cm width×70 cm length×80 up to 96 cm height and max weight Ms of 150-180 Kg are the common denominator for most of these launchers. The auxiliary payload price may vary between 3 M USD up to 10 M USD, while a single launch will cost well above 20 M USD. Even when a constellation of microsatellites is using the whole capacity of a launcher, the minimal dimensions and weight of the satellite will enable more satellites to be launched. In most cases the limiting factor for satellites in a constellation is the volume rather than the weight, thus the small dimensions of the "Auxiliary Payload" concept are beneficial also in the case of using the whole launcher to launch a large number of satellites. FIG. 19 also shows the number of satellites which may be accommodated to certain launchers According to some embodiments of the present invention the deployable flexible solar array consists of a substrate made of a flexible material such as Kapton™, or a thin layer of up to 3 mm thickness of carbon fiber but not limited to these materials, and a photo-voltaic element which is based on thin-film photovoltaic cell (TFPV). A TFPV is a solar cell that is made by depositing one or more thin layers (thin film) of photovoltaic material deposited on the substrate material, or bonding of thin, pre produced photo voltaic cells. The thin film photo voltaic cell may be made of the following materials: Amorphous silicon (a-Si) and/or thin film Silicon, and/or cadmium Telluride (CdTe), and/or copper indium gallium selenide (CIS or CIGS), and/or single cell Gallium Arsenide (GaAs), and/or flexible triple junction Gallium Arsenide (GaAs). It was shown that the technique of depositing high efficiency TEPV cells became mature in the last years and reaches efficiencies of 11% for cadmium Telluride, 20.4% for CIGS, and 26% for Single Cell Ga As and 29% for flexible triple junction Gallium Arsenide (GaAs). These efficiencies are making the use of the technology vital for use in commercial microsatellites. A technique of depositing is described in US Patent application publication 2008/0173349. The efficiency gained is described in a paper: "Development of high efficiency flexible CdTe solar cells" by A Romeo and others published in 2002. Even higher efficiencies are described in a paper published by the NREL—the National Renewable Energy Laboratory, "Overview and challenges of thin film solar electric technologies" by H. S. Ullal from 2008, and a chart "Best Research Cell Efficiencies" from NREL in 2010, showing efficiencies of up to 16%. Flisom, a Swiss company, has published laboratory test results of CIGS reaching 20.6% and near 15% of production line cells. Another company—AltaDevices of Palo Alto published a brochure of commercial Ga As single cells reaching 24.2% production line efficiency. MicroLink Devices of Niles Ill., USA describe in its internet website a solar sheet with triple junction cells that has demonstrated efficiency larger than 30% under AM1.5 illumination.

Embodiments of the present invention provide deployment mechanisms uniquely combined with the light weight substrate and flexible photo-voltaic cells.

According to further embodiments of the present invention, the satellite may include deployed radiators to enable additional heat radiating surfaces. These radiators may be connected to the satellite body via flexible heat pipes or flexible heat conducting wires to enable conduct of heat from the satellite body to the heat radiating surfaces. Current suppliers of such flexible heat pipes are THERMACORE, Swales Aerospace and others. According to additional embodiments of the present invention, the satellite may include deployed reflector antenna. As shown later in the drawings, a configuration of up to five antennas may be used. Four of them on each of the four circumferential side panels of the satellite and one on the Nadir (earth facing) panel. A maximum antenna size of about 60 cm diameter can be used, bringing the diameter of the deployed satellite (without the solar panels) to 1.82 m comparing to the 0.92 m of the stowed or non deployed satellite.

The combination of high power delivered from the solar panels together with the deployed antennas is a unique feature of this satellite and makes it extremely compatible for low earth orbit communication. These two features are the sole components of the Equivalent isotropic radiated power (EIRP) of the satellite on ground, i.e. the energy flux of the satellite. This is the most important feature of communication satellites. For traditional microsatellites this value is too low to be effective. Hence microsatellites are used today only for low bandwidth communication which requires low power. The deployable satellite according to embodiments of the present invention, as shown in FIG. 7, four antennas 35 cm dia. Each combined with the high power available for the transmitters could deliver an EIRP of 26 dbw over a large area on the ground measured 1000× 1000 Km. In addition there is a place for a single flat antenna up to 60×60 cm, or a combination of 4 25×25 cm flat antennas on the Nadir panel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 19 is a table showing examples of the auxiliary payloads capacity from several leading launchers.

Figure 1:
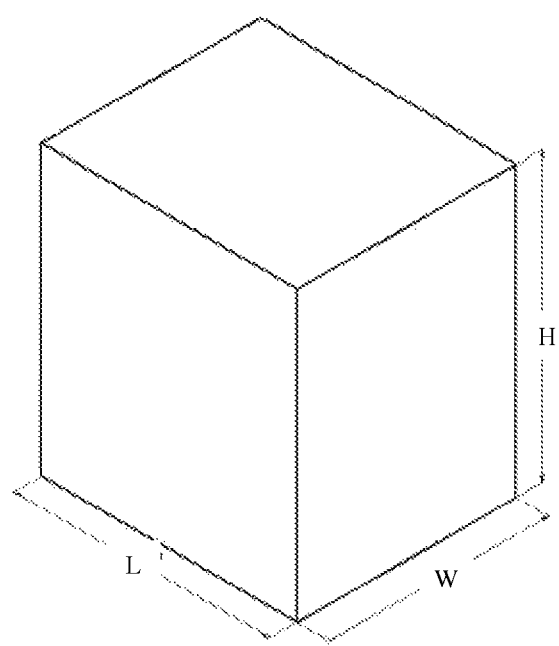
FIG. 1 which presents dimensions of maximum allowable auxiliary payload.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

According to embodiments of the current invention—the main feature of satellites built and operated according to the invention is the very large deployable flexible solar array which together with other deployable parts and appendages such as deployed antennas and deployed heat radiators enable considerable breakthrough performance for this class of satellites, that is—higher power extracted from the sun light, higher transmission power available, larger antenna areas and larger heat dissipation usable. Reference is made to FIG. 1, which presents dimensions of maximum allowable auxiliary payload volume, the dimensions of which are marked L for length, W for width and H for height.

Deployment mechanisms according to embodiments of the present invention are disclosed. The deployment mechanisms are adapted to the relative flexibility of the technology of the thin film solar cells that are used according to embodiments of the present invention.

The first deployment mechanism that is described is more adequate for extremely flexible TFPV cells such as Cadmium Telluride (CdTe) and/or Amorphous silicon (a-Si), and is described in drawings 2-13, that are explained in details herein below.

Figure 2:
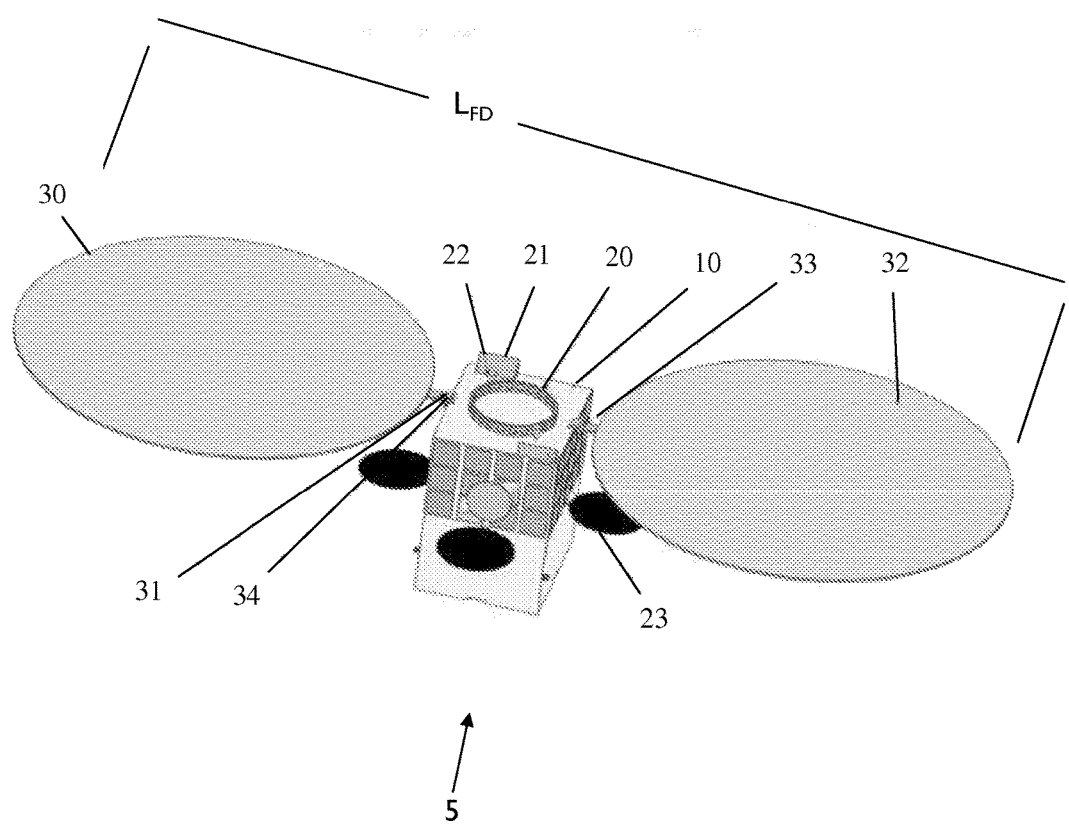
FIG. 2 is a perspective view of the fully deployed satellite according to one embodiment of the present invention.

Reference is made to FIG. 2 which is a perspective view of the fully deployed satellite 5 according to one embodiment of the present. The dimension L of the deployed satellite tip to tip may be calculated according to:

$$L_{FD}=2\times 2.7\times L+W+2+0.1$$

where L is the satellite length and W is the satellite width. And, according to some embodiments, may equal to 4.60 m. Two solar panels 30, 32 are seen fully deployed and the total area of the solar panels, according to the embodiment presented in the drawing, may be calculated according to:

$$A=\pi(2.7\times L)^2/2$$

And, for standard auxiliary payload space, may equal to 5.61 m$^2$.

According to some embodiments, the solar panels may be attached to the satellite body 10 via pivoted link rods 31, 33 and torsion springs 34. Also may be seen are the launcher separation ring 20, the thrusters 22 and sun sensors 21, 23.

Figure 3:
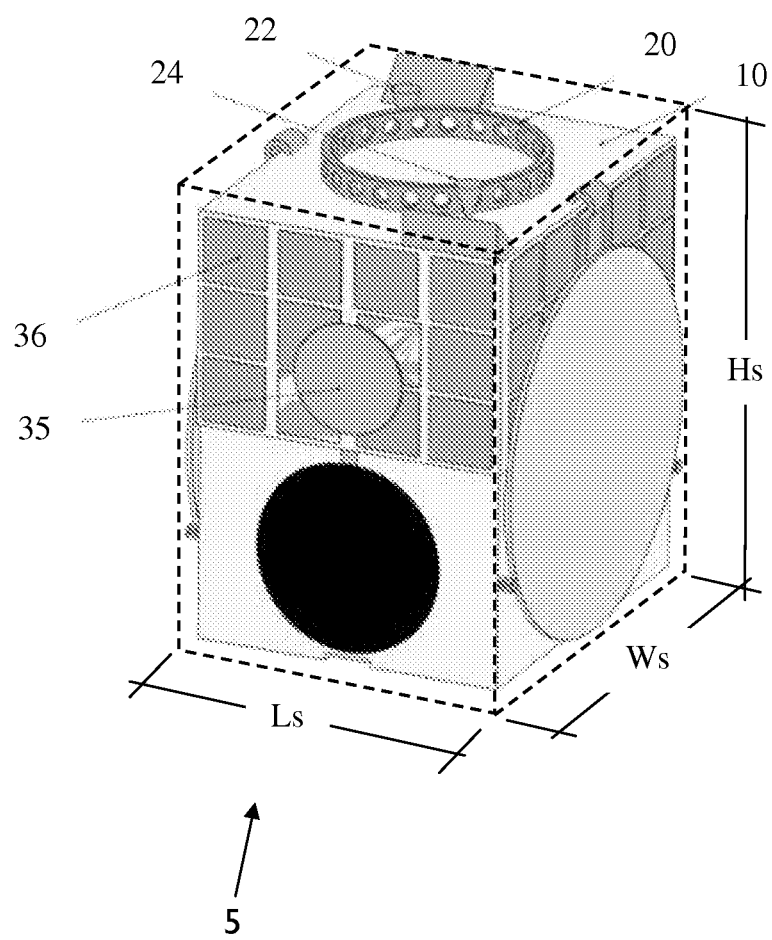
FIG. 3 is an isometric view of a stowed satellite according to some embodiments of the present invention.

The satellite is carefully designed in order to keep the satellite stowed dimensions within the limitations of the respective payload space, presented for example in FIG. 1. Reference is made to FIG. 3, which is an isometric view of a stowed satellite 5 according to some embodiments of the present invention. The micro satellite 5 may have outer dimensions which do not exceed Ws in width, Ls in length and Hs in height when in stowed position. Accordingly thee following applies:

$$W>Ws$$

$$L>Ls$$

$$H>Hs$$

As may be seen in FIG. 3 the whole satellite may be encapsulated, when in stowed position, in the auxiliary payload space volume. All the deployable elements are within the volume when stowed. Star tracker 35 may be located inside the body of satellite 5 and may be adapted to look through a window. Radiators 36 may be flush with the body of satellite 5. Sensors 21, 23 thrusters 22, 24 and separation ring 20 are within the volume limitations of the auxiliary payload. Two deployable antennas (40 in FIG. 5) may be located between the body of satellite 5 and solar panels 30, 32 (FIG. 2) when stowed, and the deployment of solar panels 30, 32 enables execution of the sequence of deploying the antennas.

Figure 13:
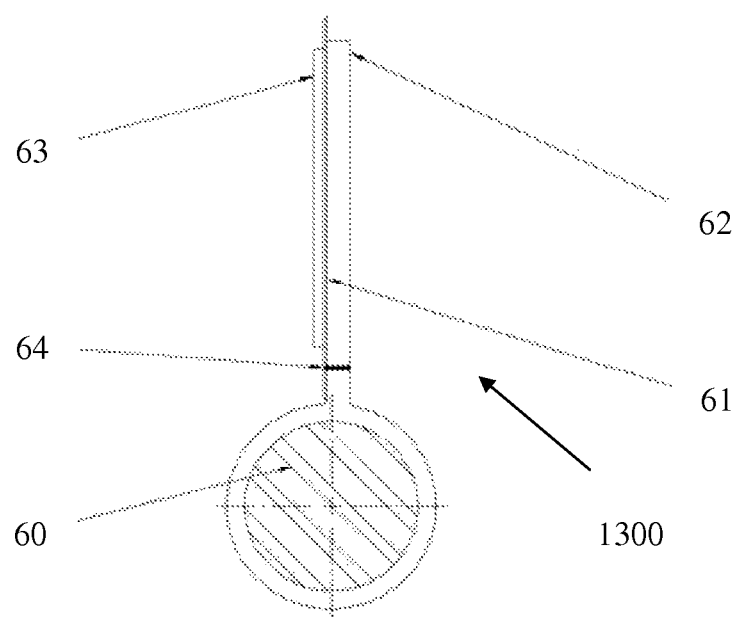
FIG. 13 is partial cross sections showing details of the solar panel according to some embodiments.

According to embodiments of the present invention deployment mechanism may be based on a circular (or elliptical) spring wire with a very small diameter of for example about 3.0 mm 60 as shown in FIG. 13 in cross section view. Substrate 61 is encircling the wire and attached by means of stitching 64. The Solar panel may be folded into an "eight" shape when stowed and may be deployed to a full circle when in space.

Figure 4:
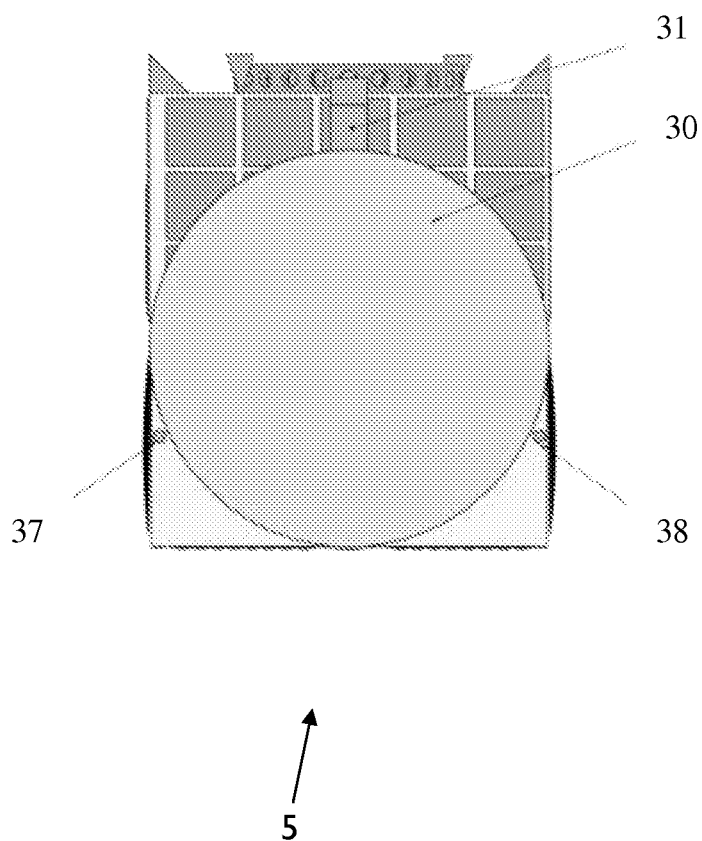
FIG. 4 is a side view of a satellite in stowed position according to some embodiments.

Reference is made to FIG. 4 which is a side view of satellite 5 in stowed position according to some embodiments, seen from the solar panel side. In this position solar panel 30 may measure up to the maximum of length L measurement of the satellite, for example 70 cm diameter, without exceeding the limitations of the respective dimensions of payload space. The solar panel may be attached to Zenith panel 10 (in FIG. 3) of the satellite by a link rod 31. According to some embodiments rod 31 may have a length that ensures that solar panel 30 and rod 31 are occupying the satellite 5 height in its entire usable length.

Figures 5, 5A:
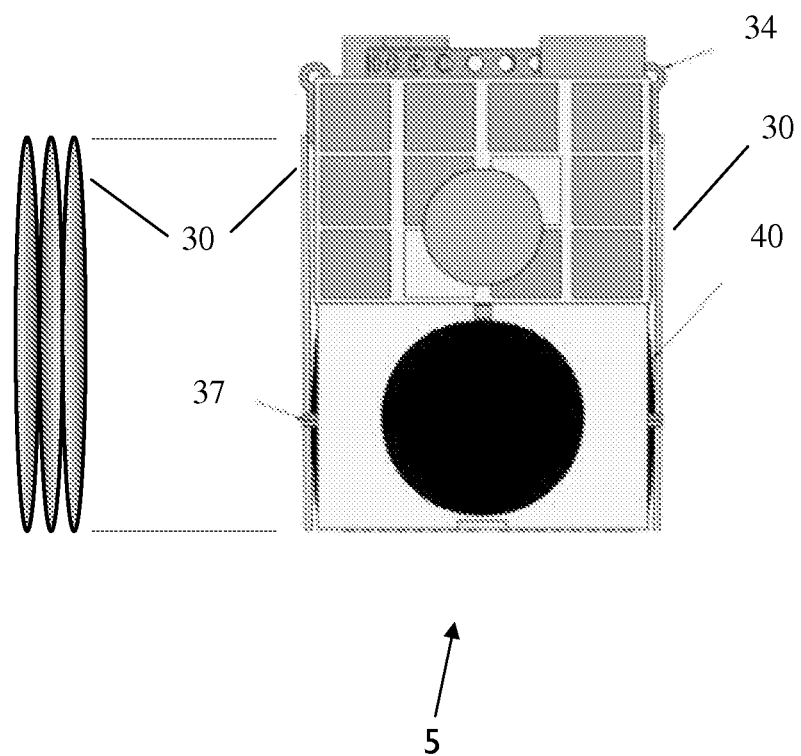
FIG. 5 is a side view of a stowed satellite, according to some embodiments, from antenna side.
FIG. 5A depicts a folded antenna slightly deployed positioned against its location on satellite according to embodiment of the present invention.

Reference is made now also to FIG. 5, which is a side view of a stowed satellite seen from the antenna side, according to some embodiments. FIG. 5A depicts a folded antenna 30 slightly deployed and positioned against its location on satellite according to embodiment of the present invention. In the depicted example of FIG. 5A antenna 30 is folded into three circles, one adjacent to the other, when in stowed position. The total thickness of the plurality of circles together is less than 10 mm. The whole assembly is attached to the satellite body by means of one or more cables which may pass through cable cutters 37, 38 as known in the art.

According to some embodiments of the present invention, combining rod 31 (FIG. 4) may be folded against torsion spring 34 in FIG. 5 at the root of rod 31, attaching it to the satellite body. Once the cables cutters are activated, the cables are cut, the energy stored in torsion spring 34 deploys rod 31 and the attached panel 30 to a 90 degrees angle with respect to the closest face of the satellite 5 body. The circular wire spring now comes into action and deploys the solar panel to a flat circle (or ellipse) out of the plurality of circles stowed one above the other in an "eight" deployed stowed position.

Figure 6:
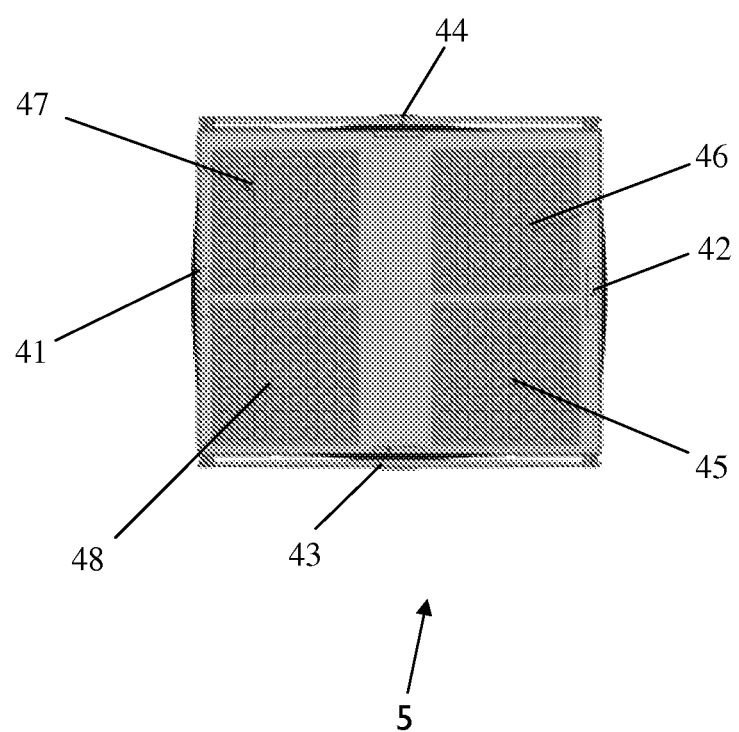
FIG. 6 is a Nadir view of a stowed satellite according to some embodiments.

FIG. 6 is a view of satellite 5 from the face usually facing the Earth (Nadir side) when satellite is in its orbit. Nadir view of a stowed satellite according to some embodiments.

Figure 7:
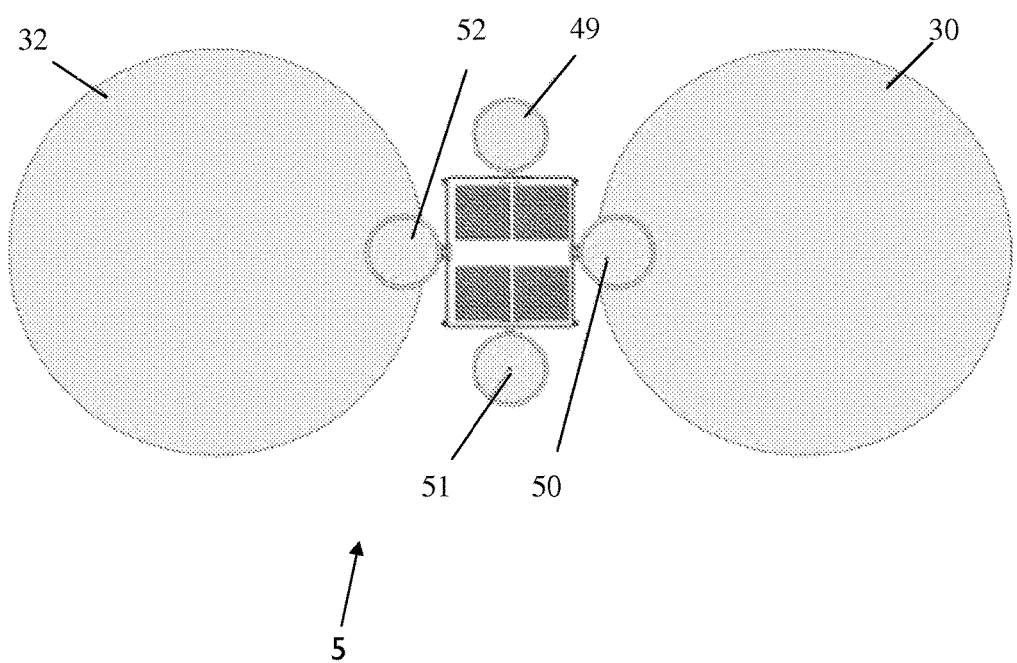
FIG. 7 is a fully deployed satellite Nadir view, according to some embodiments of the present invention.

FIG. 7 is a view of a satellite 5 in fully deployed state in Nadir view, according to some embodiments of the present invention.

Figure 8:
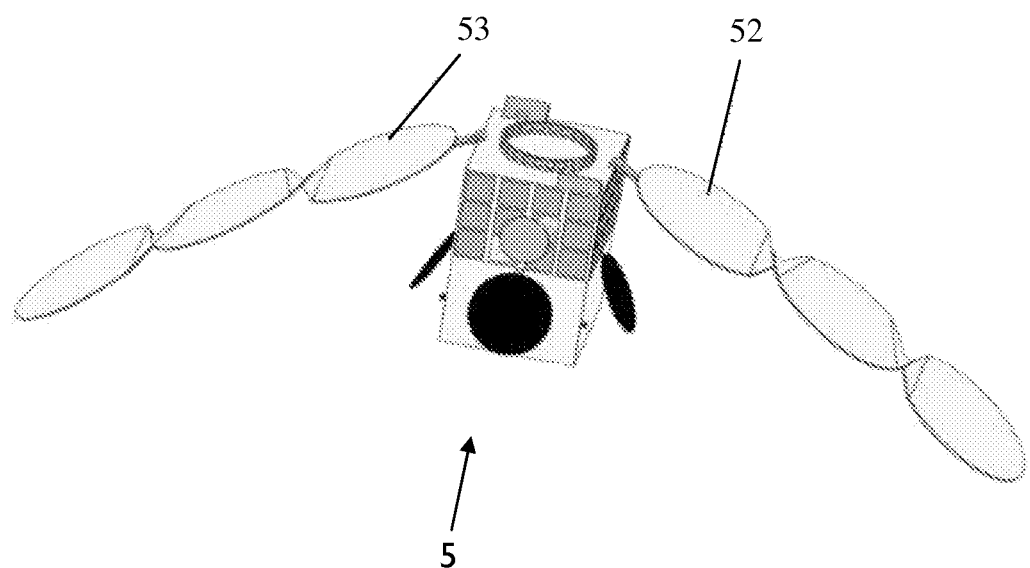
FIG. 8 is a satellite according to some embodiments of the present invention, during the level 1 deployment process.
Figure 10:
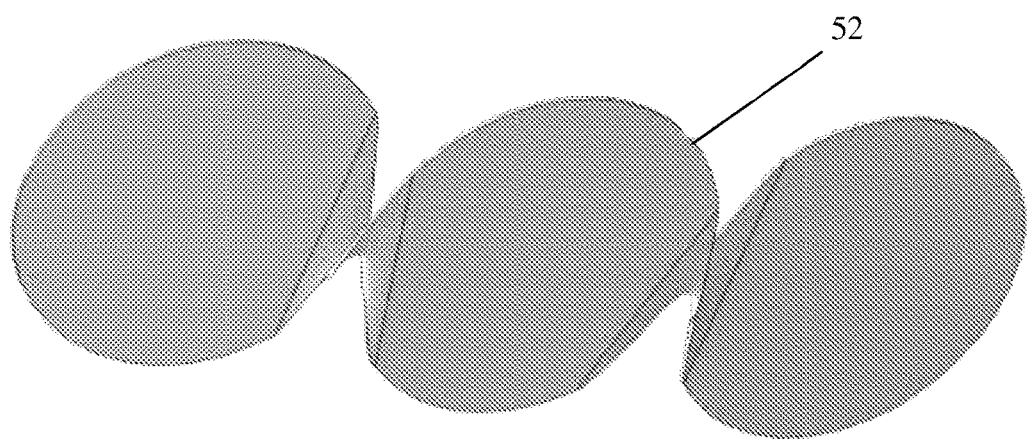
FIG. 10 depicts an enlarged view of a solar panel shortly after deployment according to embodiments of the present invention.

The deployment process is described in the following schematic figures: FIG. 8 shows two solar panels 52. 53 immediately after the release mechanism, such as cable cutters are activated and the panel assembly is released, according to embodiment of the present invention. Solar panels 52, 53 are shown here in a partially deployed position into three continuous and temporary circles while torsion springs 34 and 33 (FIG. 2) are starting the deployment process. FIG. 10 depicts an enlarged view of solar panel 52 or 53 shortly after deployment according to embodiments of the present invention, for additional clarity.

Figure 9:
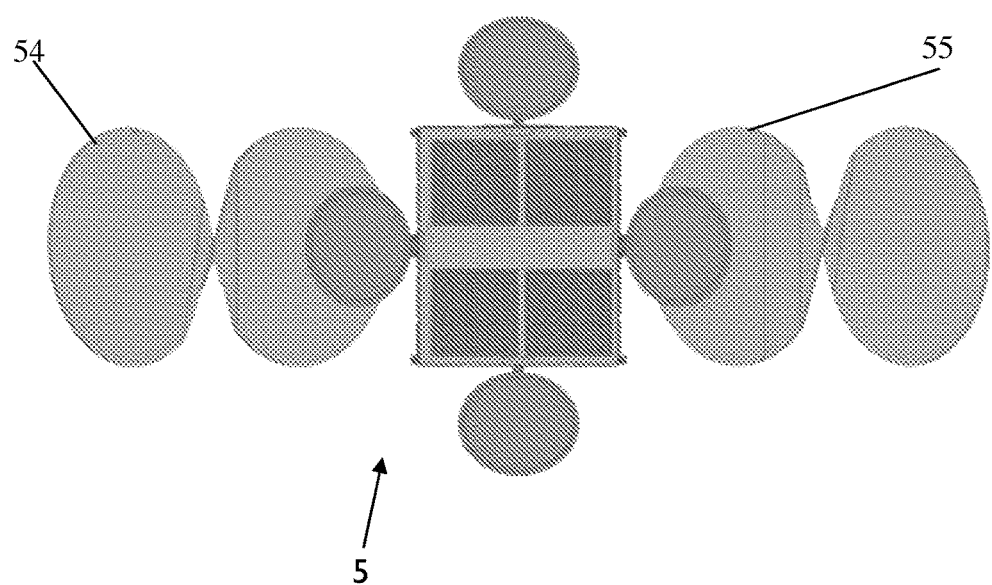
FIG. 9 is an illustration of a satellite according to some embodiments of the present invention, during the level 2 deployment process.
Figure 11:
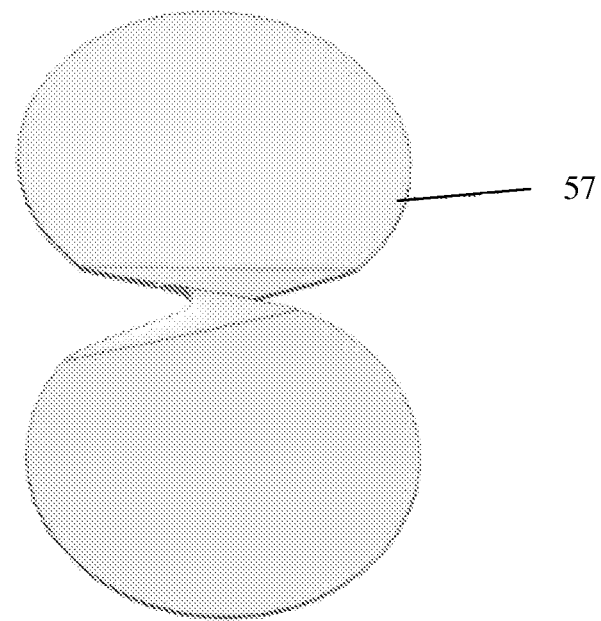
FIG. 11 is an enlarged view of a solar panel in a second stage of deployment according to embodiments of the present invention.
Figure 12:
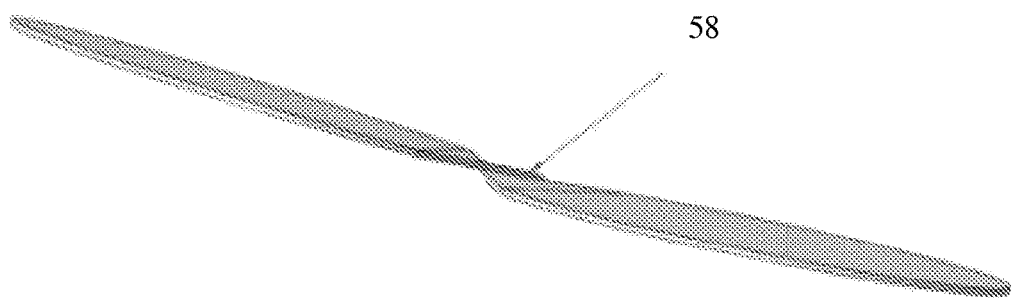
FIG. 12 is a side view of a solar panel depicting "eight" shape from a different angle, according to embodiments of the present invention.

FIG. 9 depicts satellite 5 with solar panels 54, 55 during a second stage of the deployment process (level 2) when the panels 55 and 54 are formed from three connected segment circles into two segments forming the "eight" shape. FIG. 11 is an enlarged view of solar panel 57 in a second stage of deployment according to embodiments of the present invention, made for better clarity. FIG. 12 is a side view of solar panel 57 depicting "eight" shape from a different angle, according to embodiments of the present invention.

According to some embodiments of the present invention, in an exemplary satellite the final diameter of a deployed solar panel may reach 2.7 times of the stowed diameter. Thus, if the stowed diameter of a solar panel is 70 cm, the deployed diameter may reach 1.9 meter, or 190 cm. The final area of a single panel in the above example will therefore be 2.8055 m². When using two solar panels, attached on opposing sides of the satellite, the total area of the solar panels may equal, in the above example, 5.61 m². The weight of the solar panels assembly, including the deployment mechanisms, may be less than 3 kg. Out of which 658 grams are due to the spring wire, 1130 grams are due to the Kapton substrate having thickness of approx. 0.127 inch, 84 grams are due to the two rods 31, 32 and the rest is for wirings, electrical bonding, torsion deployment spring, cable cutters and contingency. The total power that such panels deliver may reach 833 watts, in consideration of a solar radiating flux of 1350 watts/sq. meter, and a conservative solar panels efficiency of 11%. Being more conservative, and taking into account only 10% efficiency of the solar cells, and 90% fill factor of the solar cells will yields to an output total power of 680 watts. The efficiency of solar panels systems is usually measured in a "Power to Weight Ratio". In our case this ratio varies between 226 to 277 watts per kg. This is a tremendously higher ratio comparing to the number of 40-70 watts per Kg for traditional rigid solar panels using 30% efficiency triple junction rigid cells applied on glass. For comparison a traditional rigid panel that delivers 680-830 watts, has power to weight ratio of 40-70 Watts/Kg and it weighs 9.7-20.75 Kg. This additional weight will lead to the reduction of the useful payload weight and will significantly reduce the cost to performance of the payload.

Reference is made to FIG. 13, which is a partial schematic side view of deployable flexible solar array 1300 according to embodiments of the present invention. As may be seen in FIG. 13 deployable flexible solar array 1300 may be made of a substrate 61 made from a flexible material such as Kapton™ but not limited to this material, and a photo-voltaic element 63 which may be based on thin-film photovoltaic cell (TFPV). The photo-voltaic element may be made by depositing one or more thin layers (thin films) of photovoltaic material on the substrate material. The thin film photo voltaic cell may be made from the following materials: Amorphous silicon (a-Si) and/or thin film Silicon, and/or cadmium Telluride (CdTe). The technique of depositing high efficiency TEPV cells may reach efficiencies above 11%. This efficiency is making the use of the technology effective for use in commercial microsatellites. The electrical connections bonding and diodes 62 may be attached to substrate 61 in a thin flexible printed circuit method.

Figure 14A:
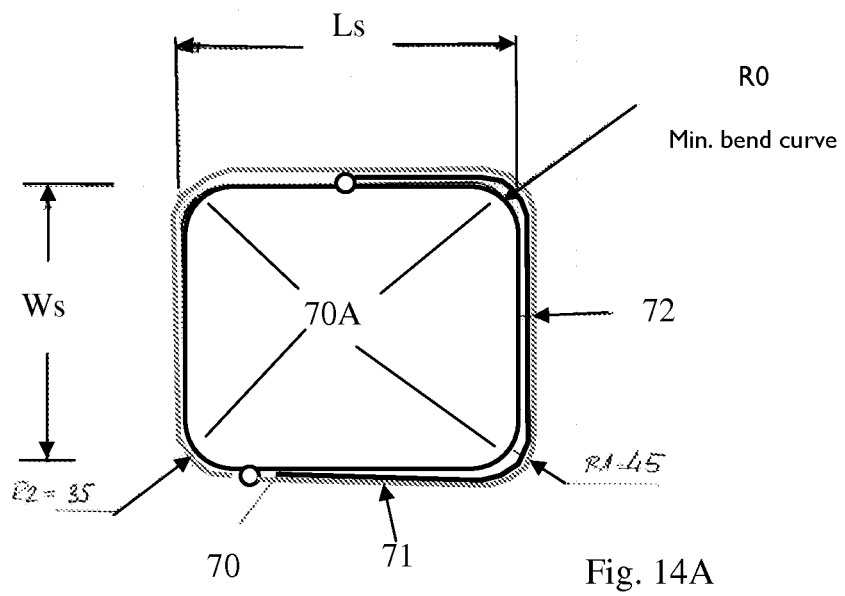
FIG. 14A, FIGS. 14B and 14C are top view, side view and isometric view respectively, of satellite structure 70 with stowed winded solar panels, according to embodiments of the present invention.
Figure 14B:
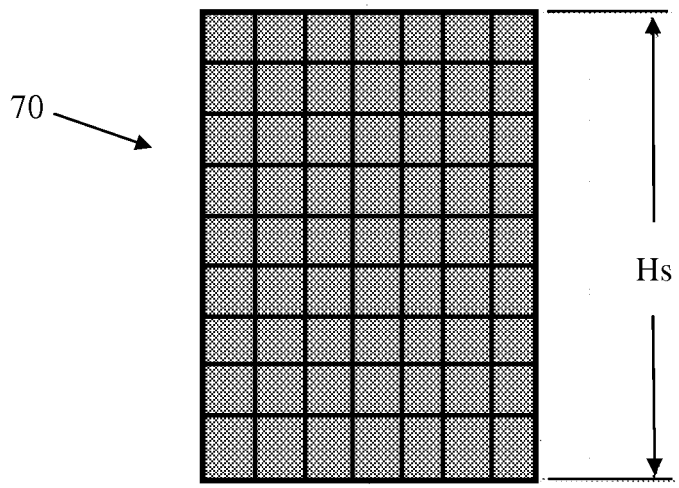
Figure 14C:
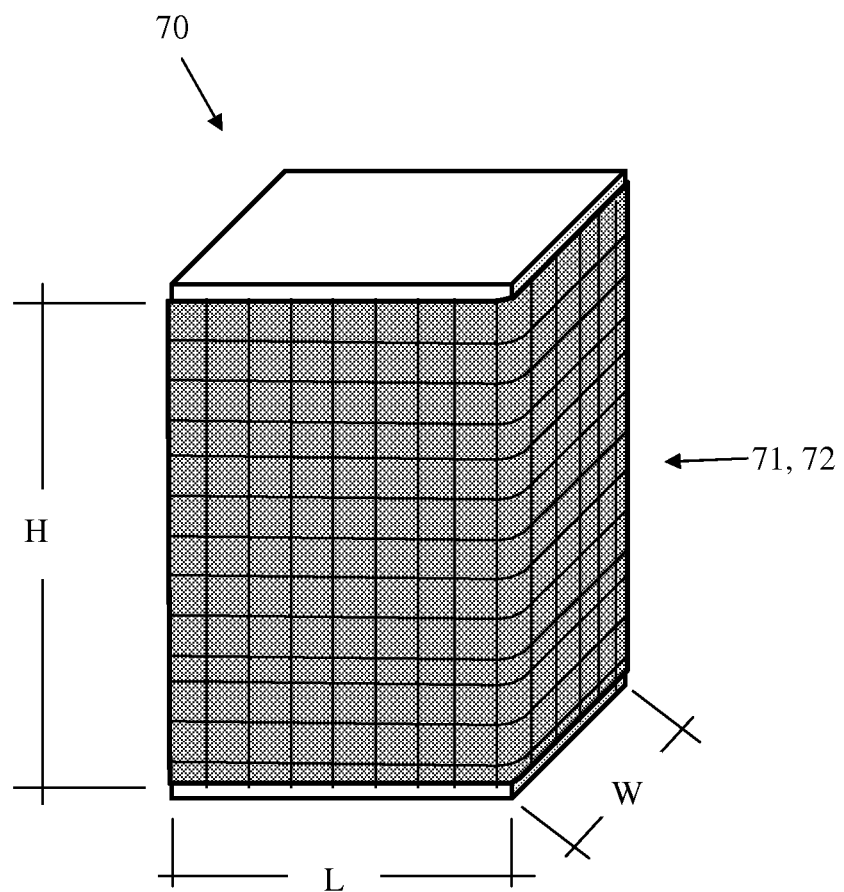

According to some embodiments of the present invention, a different stowing and deploying mechanism may be used, allowing use also of less flexible cell panels, such as CIGS or GaAs Single Cells panels, or Triple Junction flexible GaAs cells. This mechanism may take advantage of the minimal bending radius of the cell panels and substrate assembly. This minimal radius may be, according to cells manufacturers, about 2.5 cm. Reference is made to FIGS. 14A, 14B and 14C which are top view, side view and isometric view respectively, of satellite structure 70 with stowed winded solar panels, according to embodiments of the present invention. As may be seen in FIG. 14A satellite structure 70 incorporates round corners 70A connecting the side, front and rear faces of structure 70, each having a radius R0 that equals, for example, to about 2.5 cm, which is similar to the minimal panel bending radius. Two panels 71, 72 may be winded around the perimeter of satellite structure 70 comprising its front, rear and side faces. Outer panel 72 may be winded around the full perimeter of the satellite and may reach a maximum length $L2_{deployed}$ of about 2×(Ls+Ws), which may equal to about 2.6 meters when Ls=70 cm and Ws=60 cm. The deployed length $L1_{deployed}$ of panel 71 may be shorter than $L2_{deployed}$. The resulting deployed area of panel 71 may be $S1_{deployed}=L1_{deployed}\times Hs$ and the resulting deployed area of panel 72 may be $S2_{deployed}=L2_{deployed}\times Hs$.

Figure 15:
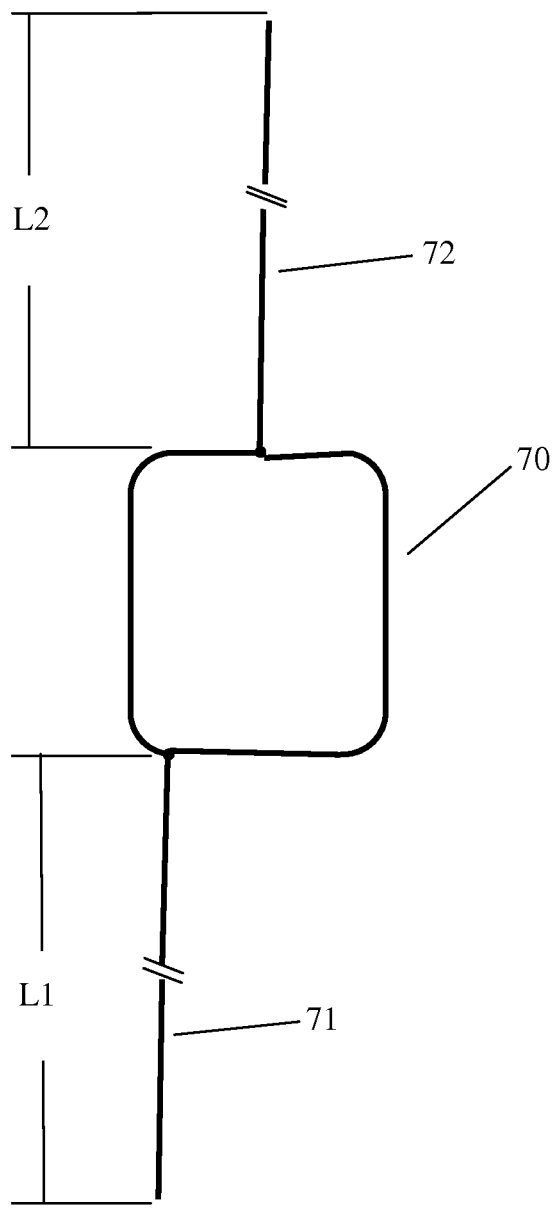
FIG. 15 schematically depicts solar panels in their deployed position seen from top view, according to embodiments of the present invention.

Reference is made to FIG. 15 which schematically depicts solar panels 71 and 72 in their deployed position seen from top view, according to embodiments of the present invention. Panel 71 may reach a maximal length of about 1.6 meter in satellite structure having dimensions of about L=70 cm and W=60 c. The total height of panels 71, 72 may equal or close to the maximum height of the satellite, (e.g. 96 cm). The maximum area of the solar array consisting of the panels 71 and 72 may be, for example, (1.6+2.6) m×0.96 m=~4 sq m. Panels 71, 72, when stowed, may be winded around and attached to the outer face of satellite structure 70 with hinges and actuating devices for example similar to those described above with respect to the first deployment mechanism described above with reference to FIGS. 2-9. The initiation of the deployment is sequential. Outer panel 72 is initiated first, and when close to be fully deployed, the deployment of inner panel 71 is initiated.

Panels 71, 72 may be rigidly attached to satellite structure 70 so that after deployment no relative movement of panels 71, 72 with respect to satellite body 70 is enabled, or be connected through a yoke and a rotating slip rings mechanism in order to allow continuous sun tracking of panels 71, 72 to keep the sun radiation perpendicular to the panels' surface.

Figure 16:
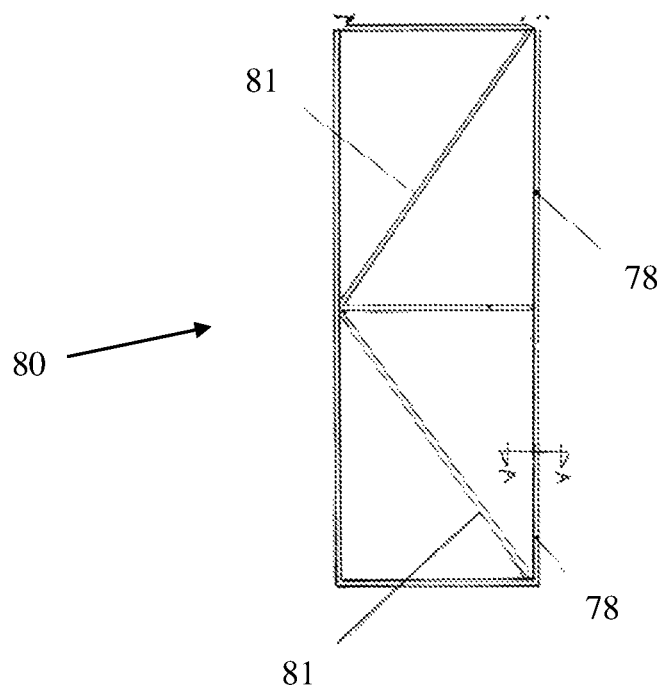
FIG. 16 and FIG. 16A are schematic illustration of a frame adapted to be deployed and hold solar panels in their deployed position and of a partial sectional view of a frame, respectively, according to embodiments of the present invention.
Figure 16A:
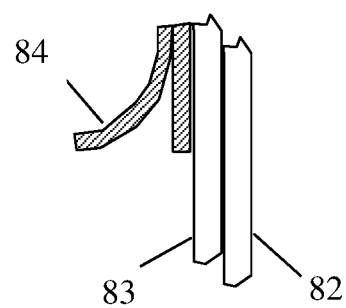

Reference is made now to FIGS. 16 and 16A, which are schematic illustration of frame 80 adapted to be deployed and hold panels 71, 72 in their deployed position and of a partial sectional view of frame 80, respectively, according to embodiments of the present invention. The deployment process, once initiated, may be forced by a spring sheet metal frame 78 which holds the panels, as may be seen in FIG. 16. The spring frame is in its maximum stored energy (compressed condition) while winded and stowed around the satellite body, so it will tend to move by the spring stored energy only to the natural (i.e.—with less stored energy) position which is the deployed position. Once the deployment process starts, at least one second spring 84 which is compressed against the body, may deploy vertically from the panel surface in (to the right of the drawing of FIG. 16A) in order to enlarge the bending moment of inertia, and to keep the panel in the straight deployed position, as may be seen in FIG. 16A, detail A-A. Also seen in detail A-A is the substrate 83 and the solar cells layer 82. The panel frame also contains diagonals 81 to keep the shape of the panel when deployed.

Figures 17A, 17B:
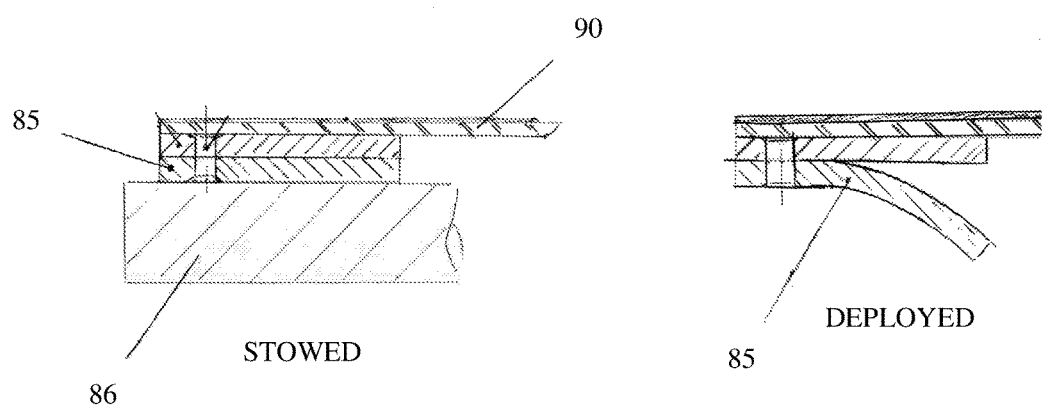
FIG. 17A and FIG. 17B show an additional spring, in stowed and in deployed positions, respectively, according to embodiments of the present invention.

Reference is made now also to FIGS. 17A and 17B which show an additional spring 85, similar to at least one second spring 84 of FIG. 16A, in stowed and in deployed positions, respectively, according to embodiments of the present invention. In FIG. 17A spring element 85 is shown compressed to the satellite body 86. The additional spring element 85 is rigidly connected to the flat frame's spring 78. The deployed view of FIG. 17B shows the additional spring 85 when released from the body pressure and bounces away to provide a moment of inertia acting vertically to the adjacent surface of the satellite body, thus adding stiffness to the panels assembly in order to avoid too low bending modes of the panels in deployed position in keeping them straight and perpendicular to the satellite body. It should be noted that the detailed design presented above of the frame and the deployment and stiffening mechanisms are an example and other means may be used to accomplish the desired deployment and stiffening mechanisms.

The amount of solar electric power receivable from the solar array depends on the chosen cells. For less expensive CIGS cells with 15% efficiency and a sun radiation flux of 1366 w/m$^2$, the maximum power will be 819 watts. For single cell GaAs with 24% efficiency the maximum power will be 1322 watts. This is a tremendously very high value for a micro satellite, and only large prior art satellites weighing around 1 ton are using such large amount of power today. The panel weight is minimal. The solar cells raw material weighs around 1 gr/watt. Adding the substrate and the described deployment mechanism will bring the array to a maximum weight of 5.5 Kg. Thus the power to weight ratio will vary between 150 to 250 watts/Kg, comparing to the above mentioned value of 40-70 watts/Kg for traditional panels.

Another important feature of this invention is the low volume required for the panels in the stowed configuration. Considering that the volume is the most important single parameter for this kind of satellites, for a stowed solar panel according to the embodiments described in FIGS. 2-12 a total width of ten (10) mm may be reduced from each side of the W side of the satellite (for example W=600 mm) dimension bringing the total volume loss to 3.3%. For the embodiment described in FIGS. 13-18 10 mm may be reduced from the L and the W faces of the satellite incurring volume loss less than 6%. Comparing the case of traditional rigid panels a total area of 2.24 m$^2$ is needed to deliver the same amount of power. According to an existing manufacturer's brochures, the total width of the panel will be 118 mm in each side or 237 mm out of 710 mm total satellite width. This represents a volume decrease of 33%, which is totally un-acceptable.

According to further feature of the present invention, the satellite may include deployed radiators to enable additional heat radiating surfaces and these radiators are connected to the satellite body via flexible heat pipes or flexible heat conducting wires to conduct the heat from the satellite body to the heat radiating surfaces. According to further feature of the present invention, the satellite may include deployed reflector antenna. As shown in FIG. 7—Fully deployed satellite Nadir view, a configuration of 5 antennas is used. Four of them, 49, 50, 51 and 52 on each of the 4 side panels of the satellite and one on the Nadir (earth facing) panel. The four deployed antennas are illuminated by four feeds—41, 42, 43, 44 in FIG. 6. A maximum antenna size of 60 cm diameter can be used, bringing the diameter of the deployed satellite (without the solar panels) to 1.82 m comparing to the 0.92 m of the stowed or non-deployed satellite. Another configuration is shown in FIG. 6. The flat antenna is divided into four segments 45, 46, 47 and 48. These segments may be four phased array antennas, or four printed circuit antennas, as may be required.

The combination of high power delivered from the solar panels together with the deployed antennas is a unique feature of a satellite according to the present invention and makes it extremely compatible for low earth orbit communication. Other Low earth orbit (LEO) communication satellites which are giving an equivalent service may weigh in the vicinity of 700 Kg. These two features are the sole components of the EIRP of the satellite on ground, i.e. the energy flux of the satellite. This is the most important feature of communication satellites. For traditional microsatellites this value is too low to be effective and may be in the vicinity of 100-200 watts. Hence microsatellites are used today mainly for low bandwidth communication which requires low power. Contrary to prior art micro satellites, a satellite according to the invention, as shown in FIG. 7, may utilize up to four antennas of 35 cm dia. This, combined with the high power available for the transmitters could deliver an EIRP (Effective Isotropic Radiated Power) of 26 dbw over a large area on the ground measured 1000×1000 Km. In addition there is a place for a single flat antenna up to 60×60 cm, or a combination of four 25×25 cm flat antennas on the Nadir panel. This combination is also suitable for the use in the cellular industry. Use of satellites according to the invention may allow a constellation of microsatellites for a worldwide cellular service which may allow the performance of much bigger and more expensive satellites.

Figures 18, 18A:
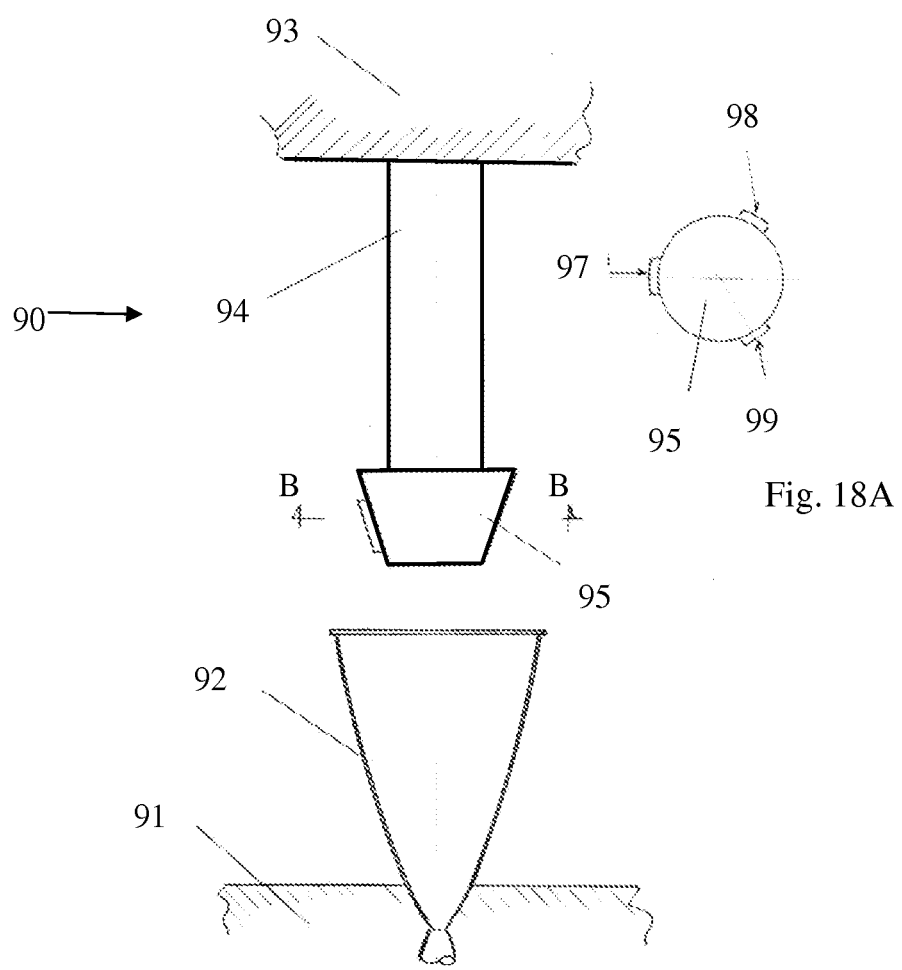
FIG. 18 is an extended arm assembly according to some embodiments of the present invention.
FIG. 18A is a view of the extended arm assembly of FIG. 18 viewed along its longitudinal axis.

The high power onboard a microsatellite also enables the unique usage of high thrust electric power which is usually used in much bigger satellite. The electric propulsion is much more efficient than chemical propulsion, and reaches Specific Impulse ($I_{sp}$) (which represents the force with respect to the amount of propellant used per unit time) of more than 1500 seconds comparing to around 330 seconds of Bi Propellant chemical propulsion. This feature enables a new family of micro satellites: GEO service. The microsatellite may be launched as an auxiliary payload to a GTO (geo transfer orbit) at about 300 Km perigee and 36000 Km apogee and then will climb to circular 36,000 Km GEO orbit using its electrical propulsion. The micro satellite may have capability of carrying cargo, defined as the total weight (or mass) of carried articles which are not essential part of the micro satellite. The total weight of the cargo may be denoted Cw. The main satellite cargo may be an excessive amount of Xenon that may be used as a fuel for the electric propulsion. The low weight and volume of the unique solar panels allows as much as 80 Kg Xenon cargo. This large amount of fuel combined with its high efficiency will allow the GEO service satellite to be used as for providing high orbit outer space services. One such service is "GEO De Orbiter"—a space tug which may be used to de orbit retired communication satellites to the "Graveyard orbit", 300 Km above the GEO belt. Retired communication satellites may weigh 2 tons averagely EOL dry weight, separated 90 degrees from each other. The approaching process is based on a 3D visual final ranging and orientation to the target communication satellite. FIG. 18 describes the docking mechanism 90 of the De Orbiter, and FIG. 18A is a view of the extended arm assembly of FIG. 18 viewed along its longitudinal axis, according to embodiments of the present invention. A single or dual DOF (Degrees Of freedom) extendable robotic arm 94 ending with a connecting cone 95 may be oriented towards the target communication satellite 91. The robotic arm may be oriented towards the satellite main thruster nozzle—Apogee Kick motor (AKM) 92, which exists in almost every communication satellite. The nozzle is typically a cone which protrudes from the satellite's envelope. In addition the cone is oriented towards the center of gravity of the satellite, thus pushing the cone will create only a straight force vector without causing any undesired moments. The robotic arm, once reached inside the nozzle will expand its head and will perform an "Edge like" mechanical locking. The expansion is performed by rotating a leading screw which is moving forward having cone surfaces that in turn are pushing three (3) locking elements 97, 98, 99 towards the nozzle cone. The pushing force is controlled by a clutch mechanism in order to avoid excessive forces on the nozzle cone which may prevent the de-locking process after the de orbiting is completed. Once the robotic arm is locked inside the target communication satellite nozzle the De Orbiter will orient the two satellites towards the desired flight vector and will operate its electric propulsion thruster to push the retired target communication satellite to its graveyard orbit. Upon reaching this orbit the robotic arm locking mechanism will reverse its operation in order to unlock the arm from the nozzle. Then the robotic arm will retreat and detached from the nozzle. The De orbiter is then ready to return to the geostationary orbit to continue servicing additional retired communication satellites.

Figure 20:
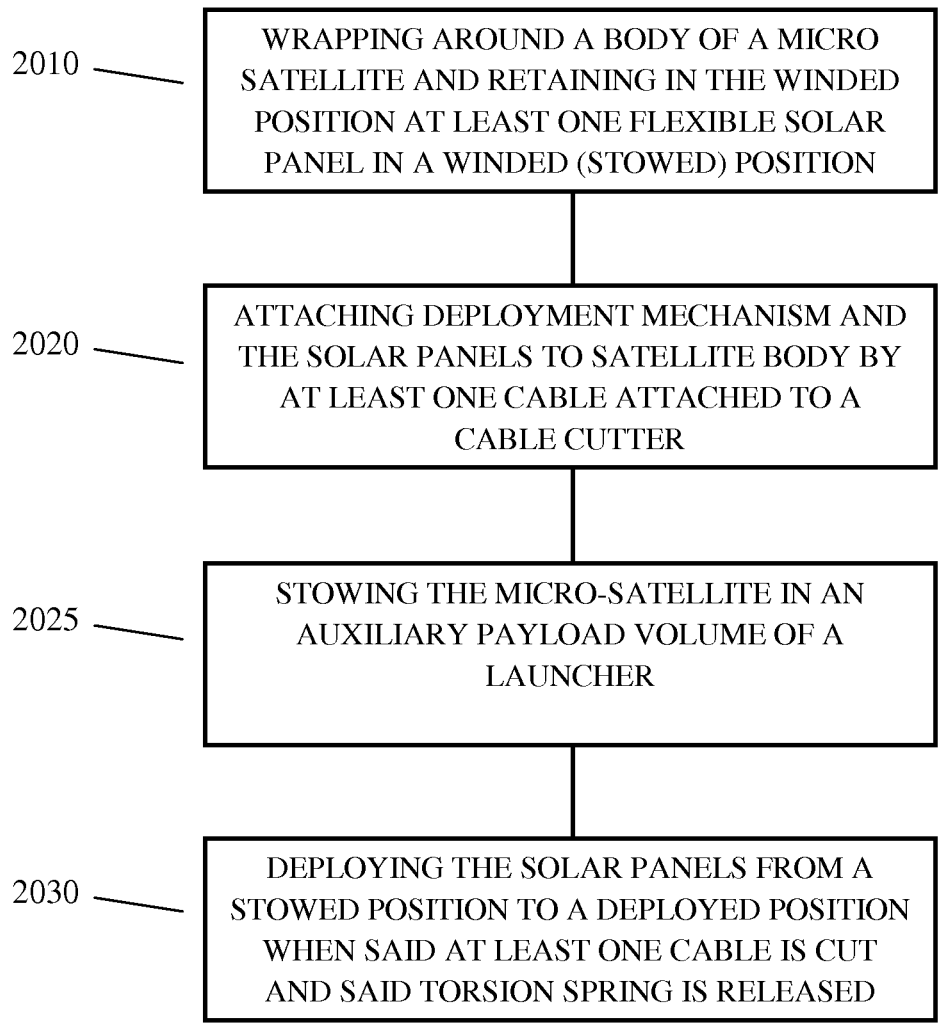
FIG. 20 is a flowchart of a method for stowing and deploying a micro-satellite according to embodiments of the present invention.

Reference is now made to FIG. 20 which is a flowchart of a method for stowing and deploying a micro-satellite according to embodiments of the present invention, the method comprising the following steps:

Wrapping around a body of a micro satellite and retaining in the winded position at least one flexible solar panel in a winded (stowed) position [block 2010]. According to one embodiment, the folding of the at least one solar panel may be into a plurality of circles placed one above the other. In yet other embodiments of the present invention, each solar panel may be folded around a portion of the micro-satellite body.

Attaching deployment mechanism and the solar panels to satellite body by at least one cable attached to a cable cutter [block 2020]

Stowing the micro-satellite in an auxiliary payload volume of a launcher [block 2025]

Deploying the solar arrays from a stowed position to a deployed position when said at least one cable is cut and said torsion spring is released [block 2030]. According to some embodiments of the present invention, the deployment mechanism may comprise a spring wire adapted to deploy said solar arrays from a stowed position.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A deployable micro satellite designed to fit, in stowed position, to a restrictive envelope having length (Ls), width (Ws) and height (Hs) of an auxiliary payload volume, comprising:
a satellite body;
a deployment mechanism and
at least one deployable flexible solar panel adapted to be wrapped around a perimeter of outer faces of the micro satellite, said satellite body comprising front, rear and side faces extending between a first face and a face opposite to the first face when in stowed position, the panel being held by a spring sheet metal frame which is in a compressed condition while wound around the micro satellite body so as to move to a natural position which is the deployed position on initiation of a deployment process;
wherein Hs>Ls>Ws,
wherein the area of said at least one deployable flexible solar panels, when fully deployed, exceeds at least 9 times Ws×Ls, and 6 times Hs×Ls.

2. The deployable micro satellite according to claim 1 wherein each of said deployable flexible solar panels is made of a thin layer of a substrate and at least one photo voltaic element stretched over said spring sheet metal frame.

3. The deployable micro satellite according to claim 1 comprising at least one second spring which is compressed against the body in the stowed position, to deploy from the panel surface in order to enlarge the bending moment of inertia, and to keep the panel in the straight deployed position.

4. The deployable micro satellite according to claim 1 wherein said solar array is a thin-film photovoltaic cell (TFPV) made of at least one material from the list of materials including amorphous silicon (a-Si), thin film Silicon, cadmium Telluride (CdTe), copper indium gallium selenide (CIGS), single cell Gallium Arsenide (GaAs), and flexible triple junction Gallium Arsenide (GaAs).

5. The deployable micro satellite according to claim 1 wherein when said at least one deployable flexible solar array is in its stowed position it employs no more than 10 mm on each side of the faces of said micro satellite along the Ls and the Ws dimensions.

6. The deployable micro satellite according to claim 1 having total weight Ms; and wherein said micro satellite is capable of carrying cargo weight Cw which is at least 0.60×Ms.

7. The deployable micro satellite of claim 6 further comprising:
docking mechanism adapted to enable docking onto another satellite, said docking mechanism comprising:
a robotic arm;
a connecting cone provided at the end of said robotic arm; and
at least one locking element disposed around the conical face of said connecting cone.

* * * * *